(12) United States Patent
Yao

(10) Patent No.: US 11,724,597 B2
(45) Date of Patent: Aug. 15, 2023

(54) VEHICLE-MOUNTED DISPLAYING METHOD, DEVICE AND VEHICLE

(71) Applicant: Shenzhen Next Generation Communications Limited, Shenzhen (CN)

(72) Inventor: Le Yao, Shenzhen (CN)

(73) Assignee: Mobile Drive Netherlands B.V., Amsterdam (NL)

(*) Notice: Subject to any disclaimer, the term of this patent is extended or adjusted under 35 U.S.C. 154(b) by 290 days.

(21) Appl. No.: 16/916,065

(22) Filed: Jun. 29, 2020

(65) Prior Publication Data

US 2021/0276421 A1    Sep. 9, 2021

(30) Foreign Application Priority Data

Mar. 5, 2020    (CN) .......................... 202010146449.4

(51) Int. Cl.
*B60K 35/00*    (2006.01)

(52) U.S. Cl.
CPC ........ *B60K 35/00* (2013.01); *B60K 2370/149* (2019.05); *B60K 2370/152* (2019.05); *B60K 2370/1529* (2019.05); *B60K 2370/16* (2019.05); *B60K 2370/177* (2019.05); *B60K 2370/785* (2019.05)

(58) Field of Classification Search
CPC ...................................................... G06F 3/013
See application file for complete search history.

(56) References Cited

U.S. PATENT DOCUMENTS

| | | | |
|---|---|---|---|
| 2013/0158778 A1 | 6/2013 | Tengler et al. | |
| 2013/0278631 A1* | 10/2013 | Border | G06Q 30/02 345/633 |
| 2014/0063064 A1* | 3/2014 | Seo | G08G 1/163 345/633 |
| 2014/0135598 A1* | 5/2014 | Weidl | A61B 5/163 600/300 |

FOREIGN PATENT DOCUMENTS

| | | |
|---|---|---|
| CN | 206664437 U | 11/2017 |
| CN | 109917920 A | 6/2019 |

* cited by examiner

*Primary Examiner* — Nan-Ying Yang
(74) *Attorney, Agent, or Firm* — ScienBiziP, P.C.

(57) ABSTRACT

A method for displaying information to the occupants of a vehicle includes setting a display-hosting region on a window of a vehicle and obtaining a number of driving parameters of the vehicle. Points of interest (POI) information, such as landmarks, and commercial and other desired locations, which satisfy a number of preset conditions according to the number of the driving parameters are obtained. Facial images and face parameters of occupants are obtained, and POI and associated information can be displayed according to the number of facial parameters. The POI information is displayed to one or more display regions.

14 Claims, 7 Drawing Sheets

VEHICLE-MOUNTED DISPLAYING METHOD, DEVICE AND VEHICLE

CROSS-REFERENCE TO RELATED DISCLOSURES

This disclosure claims priority to Chinese Patent Application No. 202010146449.4 filed on Mar. 5, 2020, the contents of which are incorporated by reference herein.

FIELD

The disclosure generally relates to vehicle-mounted display technologies, and particularly to a vehicle-mounted displaying method that combines a Point of Interest (POI) technology and a head-up display (HUD), and a device and a vehicle thereof.

BACKGROUND

Augmented reality (AR) can seamlessly combine real-world information and virtual world information. The AR simulates entity information that is not normally experienced in a certain time and space range, and overlaps the simulated information with a real-world situation. POI information can be addressed on a map in which a user may be interested, such as a shopping mall, a restaurant, a subway station, etc, and information concerning such locations. AR technology is often used to display POIs around a vehicle. The POIs are projected to a front window of the vehicle through an HUD. However, when the vehicle is moving, a large number of the POIs may be all simultaneously displayed on the front window, which may block the driver's view, thereby making safe driving more difficult and causing security problems.

BRIEF DESCRIPTION OF THE DRAWINGS

Implementations of the present technology will now be described, by way of example only, with reference to the attached figures, wherein.

DETAILED DESCRIPTION

Figure 1:
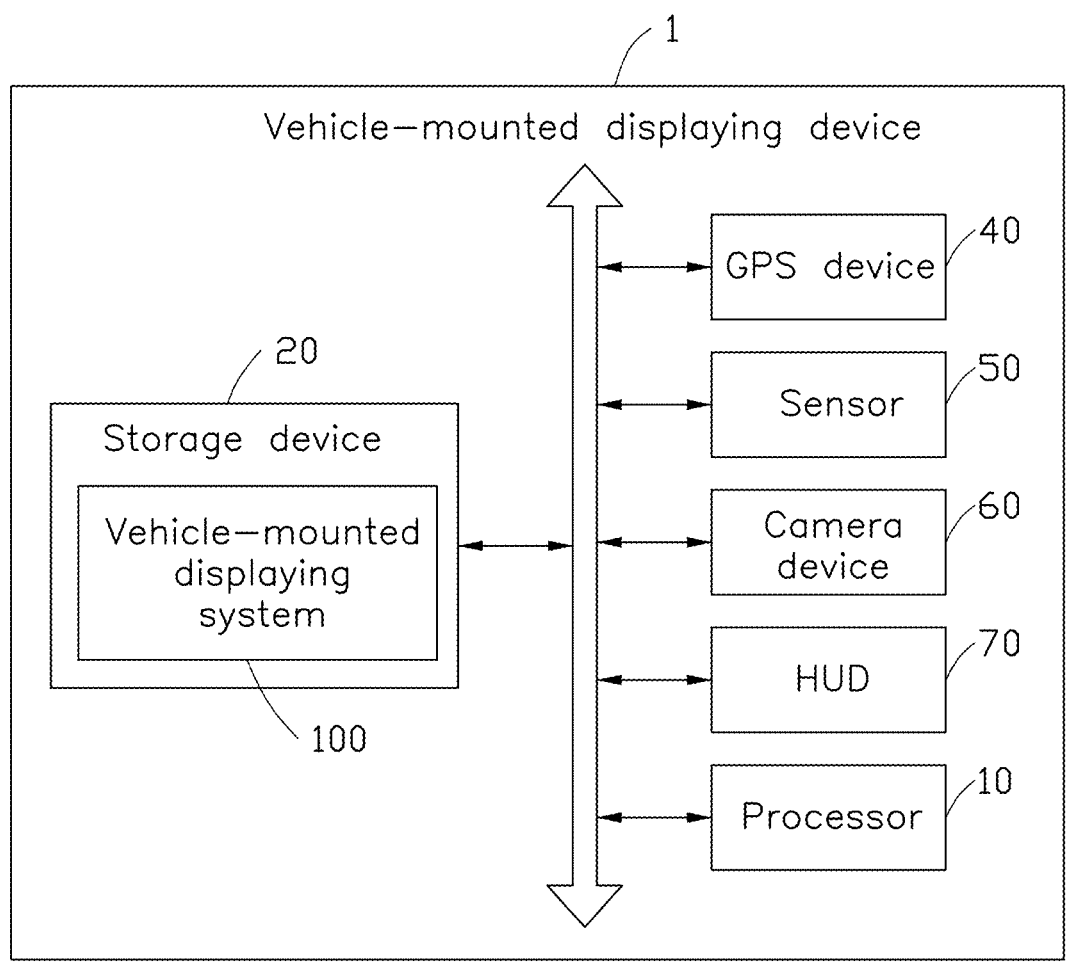
FIG. 1 is a block diagram of a vehicle-mounted displaying device, according to an exemplary embodiment.
Figure 2:
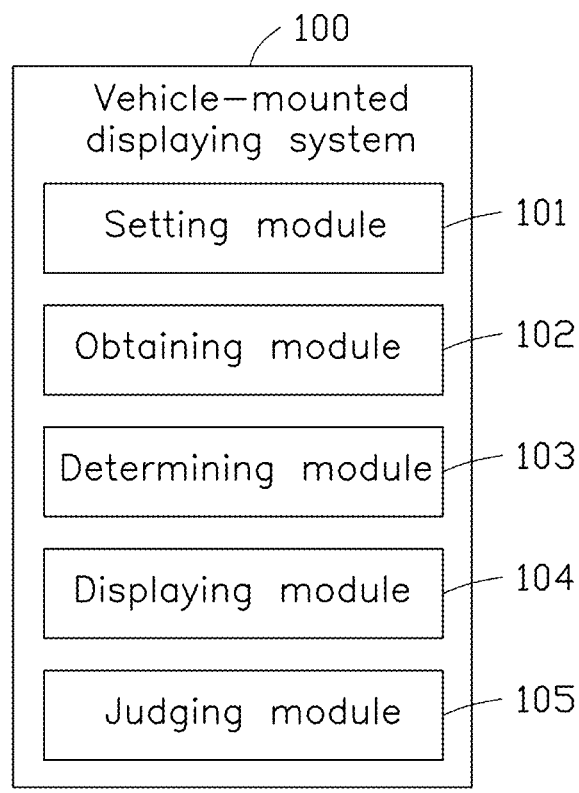
FIG. 2 is a block diagram of a vehicle-mounted displaying system, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

FIG. 1 is a block diagram of a vehicle-mounted displaying device 1 including a vehicle-mounted displaying system 100, according to an exemplary embodiment of the present application. The vehicle-mounted displaying device 1 further includes a GPS device 40, a sensor 50, a camera device 60, and an HUD 70. The vehicle-mounted displaying device 1 is used in a vehicle. The GPS device 40 is configured to obtain a current position of the vehicle. The sensor 50 is configured to sense a driving direction of the vehicle. The camera device 60 is configured to obtain face images of a driver or other occupant in the vehicle. The HUD 70 is configured to project POIs to a display region of a window of the vehicle.

The vehicle-mounted displaying device 1 further includes a storage device 20 providing one or more memory functions, and at least one processor 10. In at least one embodiment, the vehicle-mounted displaying system 100 may include computerized instructions in the form of one or more programs, which are stored in the storage device 20 and executed by the at least one processor 10 to perform operations of the vehicle-mounted displaying device 1.

The storage device 20 stores one or more programs, such as programs of the operating system, other applications of the vehicle-mounted displaying device 1, and the face images of the user. The user can be a driver or other occupant in the vehicle. In some embodiments, the storage device may include a memory of the vehicle-mounted displaying device 1 and/or an external storage card, such as a memory stick, a smart media card, a compact flash card, or any other type of memory card. FIG. 1 illustrates only one example of the vehicle-mounted displaying device 1, other examples may include more or fewer components than as illustrated, or have a different configuration of the various components.

In at least one embodiment, the vehicle-mounted displaying system 100 may include one or more modules, for example, a setting module 101, an obtaining module 102, a determining module 103, a displaying module 104, and a judging module 105. In general, the word "module", as used herein, refers to logic embodied in hardware or firmware, or to a collection of software instructions, written in a programming language, such as Java, C, or assembly. One or more software instructions in the modules may be embedded in firmware, such as in an EPROM. The modules described herein may be implemented as either software and/or hardware modules and may be stored in any type of non-transitory computer-readable medium or other storage devices. Some non-limiting examples of a non-transitory computer-readable medium include CDs, DVDs, BLU-RAY, flash memory, and hard disk drives.

The setting module 101 can be configured to set a display region. The obtaining module 102 can be configured to obtain at least one driving parameter of the vehicle and obtain POI information that satisfies a preset condition according to the at least one driving parameter. The determining module 103 can be configured to obtain images of faces and at least one facial parameter of such faces, and determine the POI information to be displayed according to the at least one facial parameter. The displaying module 104 can be configured to project the POI information to the display region. The judging module 105 can be configured to determine a change of a distance between the vehicle and the POI and to enhance or weaken a display mode of the POI information according to the change.

Figure 3:
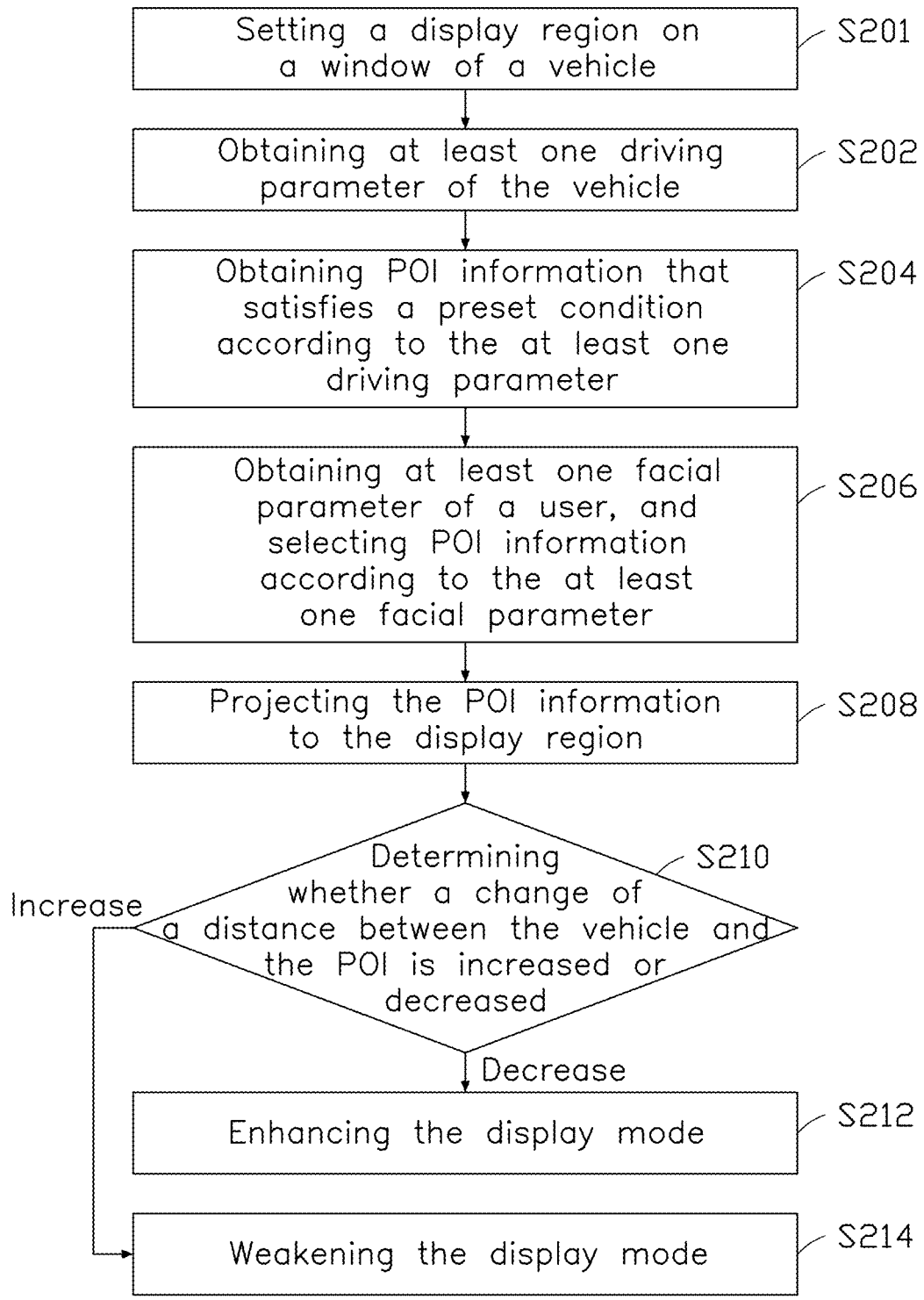
FIG. 3 is a flowchart of a method for a vehicle-mounted display of information using the vehicle-mounted displaying system of FIG. 2, according to an exemplary embodiment.

FIG. 3 is a flowchart of a vehicle-mounted displaying method, according to an exemplary embodiment of the present application. The example method 200 is provided by way of example, as there are a variety of ways to carry out the method. The method 200 described below can be carried out using the configurations illustrated in FIG. 1, for example, and various elements of these figures are referenced in explaining exemplary method 200. Each block shown in FIG. 3 represents one or more processes, methods, or subroutines, carried out in the exemplary method 200. Furthermore, the illustrated order of blocks is by example only and the order of the blocks can change according to the present disclosure. Additional blocks may be added or fewer blocks may be utilized, without departing from this disclosure. The exemplary method 200 can begin at block S201.

At block S201, the setting module 101 sets a display region on the window of the vehicle. The display region is configured to display the POI information.

Figure 5:
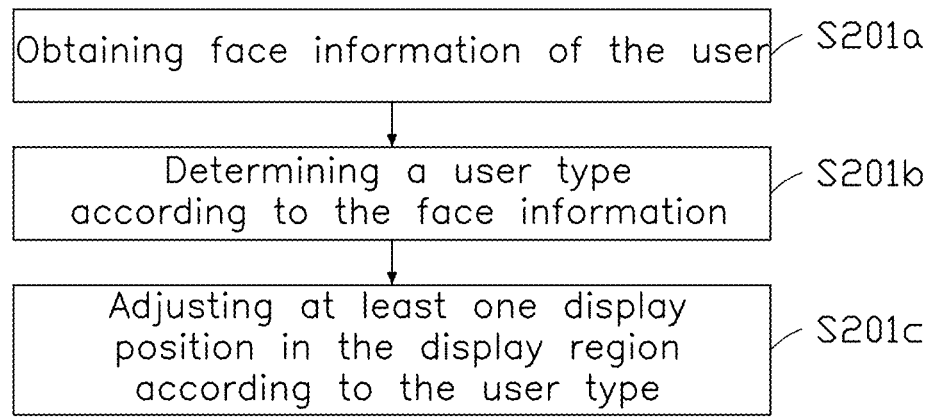
FIGS. 5, 6, and 7 are flowcharts of sub-methods of the vehicle-mounted displaying method of FIG. 3, according to an exemplary embodiment.

Also referring to FIG. 5, the block S201 can begin at block S201a.

At block S201a, the setting module 101 obtains face information of the user. The face information includes a focusing distance and a facial orientation of the face when the camera device 60 obtains the face image of the user.

The setting module 101 obtains an original image of the user through the camera device 60, and delineates a sub-image containing facial features from the original image of the user as the face image. In this embodiment, the window is a front window. The focusing distance represents a distance between the user and the front window. The focusing distance can be determined by dimensions taken from the obtained face image.

When the number of the obtained face images is more than one, one of the obtained face images can be determined as the user's face image according to the user's settings or selection. When the number of the obtained face image is only one, the obtained face image can be directly determined as the user's face image.

When the user sits in different seats on the vehicle, the corresponding focusing distances are different. For example, when the user sits in a main driver seat, a front passenger seat, a right passenger seat, and a left passenger seat, the corresponding focusing distance (or a corresponding focusing distance range) are all different from each other.

The facial orientation can be determined according to the face image of the user obtained by the camera device 60. For example, a user sitting at a right side or a left side of the vehicle has a different orientation. In another embodiment, when the user sits in the main driver seat and the front passenger seat, the face information of the user can indicate different orientations. When the user sits in the right passenger seat and the left passenger seat, the corresponding face information of the user can indicate different orientations. When the user sits in a front seat, the corresponding face information of the user can indicate different orientations.

At Block S201b, the setting module 101 determines a user type according to the face information.

The setting module 101 establishes a database. The database presets face information and a plurality of user types. The face information includes a focusing distance and a facial orientation. The user types includes a driver and a passenger. When the user sits in the driver seat, the user is the driver. When the user sits in other seats, the user is the passenger. The setting module 101 compares the obtained focusing distance with the preset focusing distance and determines the user type according to a first comparison result obtained by comparing the obtained focusing distance with the preset focusing distance. In another embodiment, the passenger can be further divided as a first type of passenger, a second type of passenger, and a third type of passenger. When the user sits in the front passenger seat, the user is the first type of passenger. When the user sits in the right rear passenger seat, the user is the second type of passenger. When the user sits in the left rear passenger seat, the user is the third type of passenger.

Furthermore, the setting module 101 further compares an obtained orientation and the preset orientation, and determines the user type by combining the first comparison and a second comparison result obtained by comparing the obtained orientation and the preset orientation and thereby increasing an accuracy of determining the user type.

At block S201c, the setting module 101 adjusts at least one display position of the display region according to the user type.

The database also presets the user types and a corresponding at least one display position. In this embodiment, when the user type is the driver and the first type of passenger, the at least one display position is positioned on the front window. When the user type is the second type of passenger, the at least one display position is positioned on a right hand side of the window of the vehicle. When the user type is the third type of passenger, the at least one display position is positioned on a left hand side of the window of the vehicle.

At block S202, the obtaining module 102 obtains the at least one driving parameter of the vehicle.

In this embodiment, the at least one driving parameter includes the current position and the driving direction. The obtaining module 102 obtains the current position of the vehicle through the GPS (Global Positioning System) device 40 installed on the vehicle and obtains the driving direction of the vehicle through the sensor 50 installed on the vehicle. In other embodiment, the at least one driving parameter can only include the current position.

At block S204, the obtaining module 102 obtains the POI information that satisfies preset condition according to the at least one driving parameter.

The obtaining module 102 searches and obtains POIs that satisfy the preset condition through a map stored in the vehicle. The POIs include different types such as buildings, caterings, accommodations, offices, and scenic spots, and information related thereto. In this embodiment, the POI information includes a POI name and associated information. Specifically, when the POI is a building, the POI information can include a name of the building, and a current selling price, etc. When the POI is a restaurant, the POI information can include a name of the restaurant, a per capita consumption price, and a seating situation, etc. When the POI is an accommodation, the POI information can include a hotel name, a per capita consumption price, and a room availability situation, etc. When the POI is an office, the POI information can include a building name, building occupants, a rental price, etc.

In this embodiment, the preset condition includes a relative distance and a preset range. The relative distance is a distance between the POI and the current position, for example, 2 kilometers. The preset range is positioned at the driving direction. The preset range can be a semi-circular area or a fan-shaped area, thereby making the POIs obtained by the obtaining module 102 more practical and useful for the user.

In other embodiment, the preset condition can further include the number of POIs not being greater than a preset number, for example, 20, thereby avoiding the display of too many POIs obtained by the obtaining module 102 making a system operate slowly and the individual POI information unclear.

At block 206, the determining module 103 selects the POI information according to the at least one facial parameter. In this embodiment, the at least one facial parameter include at least one of the face image and an eyeball position.

Figure 6:
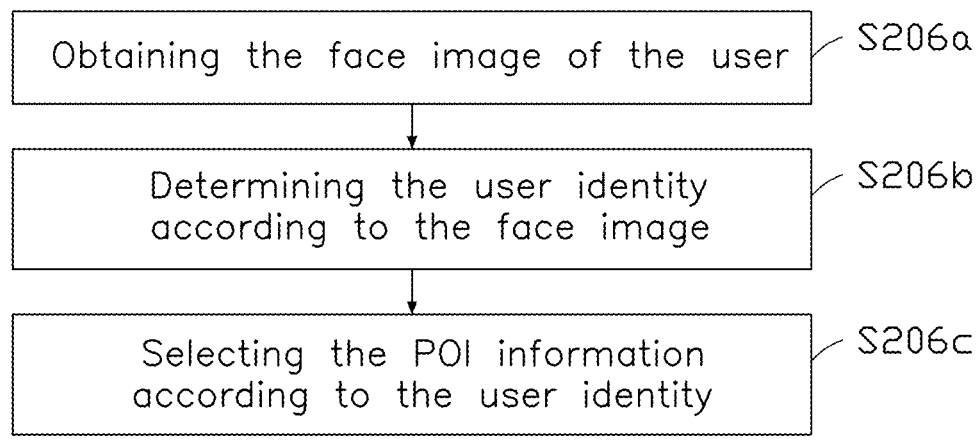

Also referring to FIG. 6, at block S206a, the obtaining module 102 obtains the face image of the user. The obtaining module 102 obtains an original image of the user through the camera device 60, and delineates a sub-image containing facial features from the image of the user as the face image. When the number of the obtained face images is more than one, one of the obtained face image can be determined as the user's face image according to the user's settings or selection. When the number of the obtained face image is only one, the obtained face image can be directly determined as the user's face image.

At block S206b, the determining module 103 determines a user identity according to the face image.

The database also presets a plurality of face images, configured to identify users. The obtaining module 102 compares the obtained face image with the preset face image, and determines the user identity according to a third comparison result obtained by comparing the obtained face image with the preset face image.

At block S206c, the determining module 103 selects the POI information according to the user identity.

The database also presets a plurality of user identities and a plurality of corresponding selecting conditions or display modes of the POI information to be displayed. The determining module 103 determines the POI information to be displayed according to at least one of the selecting condition and the display mode preset by the user.

The selecting condition includes at least one of a preset number and a preference level.

The display number is the number of the POIs to be displayed. The display number is less than or equal to the preset number, for example, five.

The preference level includes a first type of POIs in which the user is interested and a second type of POIs in which the user is not interested. The types of the POIs include buildings, caterings, accommodations, offices, scenic spots, and so on. The first type of POI include one or more types of the POIs. The determining module 103 determines that the first type of POIs is the POI information to be displayed, and determines that the second type of POIs is the POI information not to be displayed. As such, personalized services can be provided for different users. The users are allowed to filter out some POI information by setting the first type of POIs, thereby reducing irrelevant information.

In other embodiment, at block S206c, the database may further preset associated information corresponding to the first type of the POIs. For example, when the catering locations are set as the first type of the POIs, the associated information may further be preset to include the restaurant name and the seating situation.

The display mode includes a combination of at least one or more of dimensions of the display region, a shape of the display region, a color of the display region, a graphic format, and a displaying time.

The shape of the display region can be rectangular, circular, oval, and so on. The dimensions of the display region, the shape of the display region, the color of the display region, and the graphic format can be preset according to user's preferences. The displaying module 104 only displays the POIs during the display time, and does not display the POIs during other time periods. The display mode can also include a non-display region. The non-display region can be a preset region directly facing the driver. To ensure driving safety, the displaying module 104 does not display the POI information in the non-display region.

At block S208, the displaying module 104 projects the first type of POIs to the display region.

Figure 4:
FIG. 4 is a schematic view of the display of POIs by a vehicle-mounted displaying method of FIG. 3, according to an exemplary embodiment.

Referring to FIG. 4, in this embodiment, the displaying module 104 projects the POIs to the front window of the vehicle through an HUD 70 installed in the vehicle. Thus, the user can conveniently view the POIs during driving. In this embodiment, the displaying module 104 displays the POIs by means of pictures or text.

In other embodiment, after block S201b, the method may further include determining the display mode of the POIs according to the user type determined by the setting module 101, and projecting the POI information to the at least one display position by the display mode through the displaying module 104. Thus, when the user (which may be the same person or different persons) sits in different seats, the corresponding POI information may be displayed in different display modes.

Figure 7:
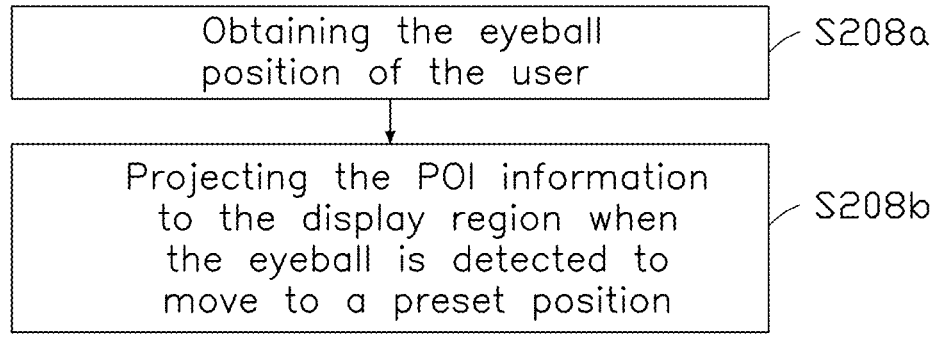

Referring to FIG. 7, block S208 can begin at block S208a,

At block S208a, the displaying module 104 obtains an eyeball position of the user.

The displaying module 104 obtains the eyeball position according to the face image. The eyeball position includes facing forward, facing left, and facing right. The eyeball position indicates a visual range of the user. For example, when the eyeball position is facing forward, the visual range of the user is a middle portion of the front window. When the eyeball position is on the left, the visual range of the user is a left portion of the front window.

At block S208b, when the displaying module 104 detects that the eyeball of the user moves to a preset position, the POI information is projected to a preset display region.

In this embodiment, when the displaying module 104 detects that the eyeball position is facing forward, the POI information is projected to the middle portion of the front window. When the displaying module 104 detects that the eyeball position is to the left, the POI information is projected to the left portion of the front window. The displaying module 104 can project the POI information according to the position of the eyeball, so that the user can readily view the displaying content.

In other embodiment, when the displaying module 104 detects that the eyeball moves to the preset position, for example, when the eyes look to the left, the POI information is projected to a left display region. When the displaying module 104 detects that the eyeball position is away from the preset position, for example, when the eyes are directly looking forward, the POI information is not displayed. At this time, the user may be the driver, and non-display of POI information avoids a visual distraction to the driver.

Referring to FIG. 3, in order to dynamically display the POI information to be displayed during travel, the method further includes the judging module 105 adjusting the display mode of the POI information according to a change of a distance between the POI and the vehicle.

At block S210, the judging module 105 determines a change of the distance between the vehicle and the POI.

The judging module 105 obtains the current position of the vehicle at a preset frequency through the GPS device 40 and determines the distance change between the current position and the POI. When the distance is increased, the process goes to block S212, when the distance is decreased, the process goes to block S214.

At block S212, the displaying module 104 enhances an output of the display mode.

At block s214, the displaying module 104 weakens the output of the display mode.

The enhancement or weakening can be a format change and/or a color change. For example, the format change includes a change of the size of the display region. Specifically, when the distance decreases, a dimension of the display region is increased. In other embodiment, the dimension of the display region has an upper limit value to avoid the display region being too large and blocking the driver's view. When the distance increases, the dimensions of the display region are decreased. In other embodiment, when the distance increases to a preset value, the corresponding POI information is not displayed.

The color change includes a change of color depth or brightness. When the distance decreases, the colors of the display region becomes deeper and the brightness of the display region becomes brighter. When the distance increases, the colors of the display region become softer and the brightness of the display region becomes darker.

Therefore, the vehicle-mounted display method, device and vehicle can obtain and display the POIs according to the preset conditions, thereby avoiding displaying too many POIs which can block the driver's view.

The embodiments shown and described above are only examples. Many details are often found in the art such as the other features. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A vehicle-mounted displaying device comprising:
    a processor; and
    a storage device, the storage device configured to store one or more programs which, when executed by the processor, cause the processor to:
    set a display region on a window of a vehicle;
    obtain at least one driving parameter of the vehicle;
    obtain point of interest (POI) information that satisfies a preset condition according to the at least one driving parameter;
    obtain at least one facial parameter of a user, determine the user identity according to the at least one facial parameter, obtain at least one selecting condition corresponding to the user identity, and select POI information according to the at least one selecting condition; and
    project the POI information to the display region;
    wherein the selecting condition comprises at least one of a display number and a preference level, the display number is a quantity of the POI to be displayed, the preference level comprises a first type of POI in which the user is interested and a second type of POI in which the user is not interested;
    the set the display region on the window of the vehicle comprises: obtain face information of the user; determine a user type according to the face information, wherein the user type comprises a driver and different types of passengers according to different seats of the vehicle, the different types of passengers comprise a first type of passenger, a second type of passenger, and a third type of passenger according to different seat positions, when the user sitting in a front passenger seat is determined, the user being the first type of passenger is determined, when the user sitting in a right rear passenger seat is determined, the user being the second type of passenger is determined, when the user sitting in a left rear passenger seat is determined, the user being the third type of passenger is determined; and the face information comprises a focusing distance and a facial orientation; and adjust at least one display position in the display region according to the user type.

2. The vehicle-mounted displaying device of claim 1, wherein the at least one driving parameter is a current position or a driving direction of the vehicle, and the preset condition is a relative distance or a preset range, the relative distance is a distance between the POI and the current position of the vehicle, the preset range is at the driving direction.

3. The vehicle-mounted displaying device of claim 1, wherein the at least one facial parameter is a face image or an eyeball position.

4. The vehicle-mounted displaying device of claim 1, wherein project the POI information to the display region comprises:
    obtain the eyeball position of the user;
    project the POI information to the display region when the eyeball is detected to move to a preset position.

5. The vehicle-mounted displaying device of claim 1, the processor further:
    changes a display mode of the POI information according to a change of a distance between the vehicle and the POI.

6. A computer-implemented method comprising:
    setting a display region on a window of a vehicle;
    obtaining at least one driving parameter of the vehicle;
    obtaining point of interest (POI) information that satisfies a preset condition according to the at least one driving parameter;
    obtaining at least one facial parameter of a user, determine the user identity according to the at least one facial parameter, obtain at least one selecting condition corresponding to the user identity, and selecting POI information according to the at least one selecting condition; and
    projecting the POI information to the display region;
    wherein the selecting condition comprises at least one of a display number and a preference level, the display number is a quantity of the POI to be displayed, the preference level comprises a first type of POI in which the user is interested and a second type of POI in which the user is not interested;

the setting the display region on the window of the vehicle comprises: obtaining face information of the user; determining a user type according to the face information, wherein the user type comprises a driver and different types of passengers according to different seats of the vehicle, the different types of passengers comprise a first type of passenger, a second type of passenger, and a third type of passenger according to different seat positions, when the user sitting in a front passenger seat is determined, the user being the first type of passenger is determined, when the user sitting in a right rear passenger seat is determined, the user being the second type of passenger is determined, when the user sitting in a left rear passenger seat is determined, the user being the third type of passenger is determined; and the face information comprises a focusing distance and a facial orientation; and adjusting at least one display position in the display region according to the user type.

7. The method of claim 6, wherein the at least one driving parameter is a current position or a driving direction of the vehicle, and the preset condition is a relative distance or a preset range, the relative distance is a distance between the POI and the current position of the vehicle, the preset range is at the driving direction.

8. The method of claim 6, wherein the at least one facial parameter is a face image or an eyeball position.

9. The method of claim 6, wherein projecting the POI information to the display region comprises:
obtaining the eyeball position of the user;
projecting the POI information to the display region when the eyeball is detected to move to a preset position.

10. The method of claim 6, further comprising:
changing a display mode of the POI information according to a change of a distance between the vehicle and the POI.

11. A non-transitory storage medium having stored instructions that, when executed by a processor of a vehicle-mounted displaying device, cause the vehicle-mounted displaying device to perform a vehicle-mounted displaying method, the method comprising:
setting a display region on a window of a vehicle;
obtaining at least one driving parameter of the vehicle;
obtaining point of interest (POI) information that satisfies a preset condition according to the at least one the driving parameter;
obtaining at least one facial parameter of a user, determine the user identity according to the at least one facial parameter, obtain at least one selecting condition corresponding to the user identity, and selecting POI information according to the at least one selecting condition; and
projecting the POI information to the display region;
wherein the selecting condition comprises at least one of a display number and a preference level, the display number is a quantity of the POI to be displayed, the preference level comprises a first type of POI in which the user is interested and a second type of POI in which the user is not interested;
the setting the display region on the window of the vehicle comprises: obtaining face information of the user; determining a user type according to the face information, wherein the user type comprises a driver and different types of passengers according to different seats of the vehicle, the different types of passengers comprise a first type of passenger, a second type of passenger, and a third type of passenger according to different seat positions, when the user sitting in a front passenger seat is determined, the user being the first type of passenger is determined, when the user sitting in a right rear passenger seat is determined, the user being the second type of passenger is determined, when the user sitting in a left rear passenger seat is determined, the user being the third type of passenger is determined; and the face information comprises a focusing distance and a facial orientation; and adjusting at least one display position in the display region according to the user type.

12. The non-transitory storage medium of claim 11, wherein the at least one driving parameter is a current position or a driving direction of the vehicle, and the preset condition is a relative distance or a preset range, the relative distance is a distance between the POI and the current position of the vehicle, the preset range is at the driving direction.

13. The non-transitory storage medium of claim 11, wherein the at least one facial parameter is a face image or an eyeball position.

14. The non-transitory storage medium of claim 11, wherein projecting the POI information to the display region comprises:
obtaining the eyeball position of the user;
projecting the POI information to the display region when the eyeball is detected to move to a preset position.

* * * * *